United States Patent
Glew

(10) Patent No.: US 8,318,819 B2
(45) Date of Patent: *Nov. 27, 2012

(54) COMPOSITIONS FOR COMPOUNDING FOAMABLE, FLUROPOLYMER PELLETS FOR USE IN MELT PROCESSING CELLULAR OR FOAMED FLUOROPOLYMER APPLICATIONS

(75) Inventor: Charles A. Glew, Charlestown, RI (US)

(73) Assignee: Cable Components Group, LLC, Pawcatuck, CT (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/451,370

(22) PCT Filed: Aug. 1, 2008

(86) PCT No.: PCT/US2008/009285

§ 371 (c)(1),
(2), (4) Date: Nov. 9, 2009

(87) PCT Pub. No.: WO2009/020554

PCT Pub. Date: Feb. 12, 2009

(65) Prior Publication Data

US 2010/0151243 A1    Jun. 17, 2010

Related U.S. Application Data

(60) Provisional application No. 60/963,322, filed on Aug. 3, 2007, provisional application No. 60/953,729, filed on Aug. 3, 2007.

(51) Int. Cl.
*C08J 9/00* (2006.01)
*B32B 3/26* (2006.01)

(52) U.S. Cl. ................ 521/91; 521/79; 521/80; 521/50; 521/82; 521/145; 428/314.4; 428/314.8

(58) Field of Classification Search .................... 521/91, 521/79, 80, 50, 82, 145; 428/315.5, 315.7, 428/314.4, 314.8, 317.9
See application file for complete search history.

(56) References Cited

U.S. PATENT DOCUMENTS

| | | | |
|---|---|---|---|
| 3,624,250 A | 11/1971 | Carlson | |
| 4,029,868 A | 6/1977 | Carlson | |
| 4,331,619 A | 5/1982 | Chung et al. | |
| 4,394,460 A | 7/1983 | Chung et al. | |
| 4,513,129 A | 4/1985 | Nakagawa et al. | |
| 4,524,194 A | 6/1985 | Dumoulin | |
| 4,711,811 A | 12/1987 | Randa | |
| 4,739,024 A | 4/1988 | Moggi et al. | |
| 4,982,009 A | 1/1991 | Hung | |
| 5,229,432 A | 7/1993 | Muschiatti | |
| 5,310,838 A | 5/1994 | Hung et al. | |
| 5,571,462 A | 11/1996 | Hashimoto et al. | |
| 5,610,203 A * | 3/1997 | Buckmaster et al. | 521/85 |
| 5,677,404 A | 10/1997 | Blair | |
| 5,688,885 A | 11/1997 | Blair | |
| 5,703,185 A | 12/1997 | Blair | |
| 5,883,197 A | 3/1999 | Barbieri et al. | |
| 5,912,278 A | 6/1999 | Venkataraman | |
| 5,959,022 A | 9/1999 | Lin et al. | |
| 6,064,008 A | 5/2000 | Craton | |
| 6,139,957 A | 10/2000 | Craton | |
| 6,231,919 B1 | 5/2001 | Craton | |
| 6,232,357 B1 | 5/2001 | Barbieri et al. | |
| 6,395,795 B1 | 5/2002 | Hrivnak | |
| 6,506,809 B2 | 1/2003 | Hrivnak | |
| 6,512,013 B2 | 1/2003 | Hrivnak | |
| 6,573,303 B2 | 6/2003 | Liu et al. | |
| 6,812,314 B2 | 11/2004 | Lunardi et al. | |
| 6,946,495 B2 | 9/2005 | Zwynenburg et al. | |
| 7,172,719 B2 | 2/2007 | Jackson et al. | |
| 7,202,418 B2 | 4/2007 | Glew | |
| 7,241,826 B2 | 7/2007 | Shiotsuki et al. | |
| 7,439,297 B2 | 10/2008 | Abusleme et al. | |
| 7,465,879 B2 | 12/2008 | Glew | |
| 7,473,849 B2 | 1/2009 | Glew | |
| 7,473,850 B2 | 1/2009 | Glew | |
| 7,968,613 B2 * | 6/2011 | Glew et al. | 521/91 |

(Continued)

FOREIGN PATENT DOCUMENTS

EP    1520880 A    4/2005

(Continued)

OTHER PUBLICATIONS

International Search Report for International Application No. PCT/EP2008/060119 by Authorized Officer Udo Puttins, completed Dec. 16, 2008 and mailed Dec. 29, 2008.

(Continued)

*Primary Examiner* — Hai Vo
(74) *Attorney, Agent, or Firm* — Nutter McClennen & Fish LLP; Christopher J. Stow; Reza Mollaaghababa

(57) ABSTRACT

The disclosure provides a composition as well as a set of compositions and method for producing cellular or foamed or blown fluoropolymers such as perfluoropolymers and other thermoplastics articles allowing for the creation of a lower cost communications cable, conductor separator, conductor support-separator, jacketing, tape, wire insulation and in some cases a conduit tube as individual components or combined configurations that exhibit improved electrical, flammability and optical properties. Specifically, the foamable or blown fluoropolymer such as a perfluoropolymer cellular insulation composition comprises; talc and the selected fluoropolymer such as perfluoropolymers. Compounded pellets or products resulting in cellular or foamable products using these pellets has also been realized by providing the melt combination in the pellets of only talc and a perfluoropolymer.

20 Claims, No Drawings

U.S. PATENT DOCUMENTS

| | | | |
|---|---|---|---|
| 2002/0061934 A1 | 5/2002 | Hrivnak | |
| 2004/0198886 A1 | 10/2004 | Shiotsuki et al. | |
| 2005/0107517 A1 | 5/2005 | Abusleme et al. | |
| 2005/0165165 A1 | 7/2005 | Zwynenburg et al. | |
| 2005/0199415 A1 | 9/2005 | Glew | |
| 2006/0237217 A1 | 10/2006 | Glew | |
| 2006/0237218 A1 | 10/2006 | Glew | |
| 2006/0237219 A1 | 10/2006 | Glew | |
| 2007/0052124 A1 | 3/2007 | Park et al. | |
| 2007/0102188 A1 | 5/2007 | Glew | |
| 2007/0203281 A1 | 8/2007 | Alric et al. | |
| 2007/0209825 A1 | 9/2007 | Glew | |
| 2008/0087454 A1 | 4/2008 | Ohno et al. | |
| 2008/0264670 A1 | 10/2008 | Glew | |
| 2008/0283271 A1 | 11/2008 | Kenny et al. | |
| 2009/0018225 A1 | 1/2009 | Gemmel et al. | |
| 2009/0048359 A1 | 2/2009 | Glew | |
| 2009/0069480 A1 | 3/2009 | Zangara et al. | |
| 2010/0072644 A1 | 3/2010 | Glew | |
| 2010/0151243 A1 | 6/2010 | Glew | |
| 2010/0206609 A1 | 8/2010 | Glew | |
| 2010/0243291 A1 | 9/2010 | Glew | |
| 2011/0224318 A1 | 9/2011 | Glew et al. | |

FOREIGN PATENT DOCUMENTS

| | | |
|---|---|---|
| EP | 2008-060119 | 12/2009 |
| EP | 2 176 326 B1 | 7/2011 |
| EP | 2 380 923 A1 | 10/2011 |
| JP | 07-026050 A | 1/1995 |
| JP | 08-012796 A | 1/1996 |
| JP | 09-055120 A2 | 2/1997 |
| JP | 19-126631 A | 5/2007 |
| JP | 2007-126631 A | 5/2007 |
| KR | 10-0129862 B1 | 4/1998 |
| KR | 0129862 B1 | 4/1998 |
| KR | 10-2007-0004583 A | 1/2007 |
| KR | 20070004583 A | 1/2007 |
| WO | 97-15623 A1 | 5/1997 |
| WO | 03-000792 A | 1/2003 |
| WO | 2009/019209 A1 | 2/2009 |
| WO | 2009/020554 A2 | 2/2009 |
| WO | 2009/020555 A2 | 2/2009 |
| WO | 2009020554 A3 | 2/2009 |
| WO | 2009020555 A3 | 2/2009 |

OTHER PUBLICATIONS

PCT Written Opinion of the International Searching Authority (PCT Rule 43bis.1) on Application No. PCT/EP2008/060119 by Authorized Officer Udo Puttins.

PCT International Preliminaty Report on Patentability (Chapter I of the Patent Cooperation Treaty) (PCT Rule 44bis) on Application No. PCT/EP2008/060119 by Authorized Officer Yolaine Cussac, and dated Feb. 9, 2010.

Glew, Charles A., The Preliminary Amendment to the title "Compositions, additives, and compounds for melt processable, foamable, and cellular fluoroploymers", U.S. Appl. No. 12/590,471, filed Nov. 9, 2009, Preliminary Amendment filed Jan. 22, 2010 with the EFS ID No. 6801435, all pages, not published.

Mineral Data Publishing, 2001, Talc.

AClyn Flyer, Honeywell, 2003.

Extended European Search Report issued Sep. 28, 2011 for Application No. 11169333.9 (5 pages).

Mexican Office Action issued Sep. 22, 2011 for Application No. MX/a/2009/008301 (2 pages).

* cited by examiner

COMPOSITIONS FOR COMPOUNDING FOAMABLE, FLUROPOLYMER PELLETS FOR USE IN MELT PROCESSING CELLULAR OR FOAMED FLUOROPOLYMER APPLICATIONS

RELATED APPLICATIONS

The present application is a national-stage filing under 35 U.S.C. §371 of PCT International Application PCT/US2008/009285, titled "Compositions for Compounding and Extrusion of Foamed Fluoropolymers", filed 1 Aug. 2008, which claims priority to U.S. Provisional Patent Application No. 60/963,322, titled "Compositions for Compounding and Extrusion of Foamed Fluoropolymers for Wire and Cable Applications", filed 3 Aug. 2007.

The present application also claims priority under 35 U.S.C. §120 from U.S. patent application Ser. No. 12/221,280, titled, "Compositions for Compounding, Extrusion and Melt Processing of Foamable and Cellular Fluoropolymers", filed 1 Aug. 2008; PCT International Application No. PCT/US2008/009286, titled "Compositions for Compounding, Extrusion and Melt Processing of Foamable and Cellular Fluoropolymers," filed 1 Aug. 2008 and each of which also takes original priority from both U.S. Provisional Application No. 60/963,322, titled "Compositions for Compounding and Extrusion of Foamed Fluoropolymers for Wire and Cable Applications", filed 3 Aug. 2007 and U.S. Provisional Application No. 60/953,729, titled "Perfluoropolymer Foamable Composition", also filed 3 Aug. 2007.

Each of these references is hereby expressly incorporated by reference herein in its entirety.

FIELD OF INVENTION

Wire and cable applications, especially those using copper conductors, utilize the insulative properties of specific polymers over the conductors as insulation and over the entire cable core of insulated conductors as jackets. Cable fillers of varying shapes and size are used as well for their insulative properties and more specifically in communications designs to minimize pair-to-pair crosstalk within a cable as will as mitigating crosstalk between adjacent cables which is commonly referred to as "alien crosstalk." Jackets and cable fillers provide mechanical and physical properties as well as an ever evolving requirement for enhanced fire performance i.e. (reduced flame spread, ignitability, and smoke evolution.) These mechanical, physical and fire retardancy performance requirements apply to fiber optic cables as well. Cable design demands a balance of these performance requirements and the attributes of processing, e.g., extruding a cellular foamed fluoropolymer (such as a perfluoropolymer) that improves both insulation values e.g. (lower crosstalk in communications cables) while lowering material content and therefore the amount of combustible materials used in a cable. These added performance characteristics through cellular (or microcellular) foaming can additionally lower cost of the overall cable design.

BACKGROUND OF INVENTION

Communication cables have evolved continuously over the years as we have evolved from a voice-based telecommunication network environment to the new structured cabling designs for high-speed data transmission which are commonly referred to as Local Area Networks or LAN's. Technical requirements, standards and guidelines of the Telecommunication Industry Association and Electronic Industry Association (TIA/EIA) and International Standard Organization (ISO) have been developed and published to support high-speed data communication of voice, internet and video. In addition, these requirements continue to evolve with more and more stringent electrical performance needs such that cellular foam insulation and fillers play an increasing role in the cable designs. The primary communications cable designs incorporate twisted copper pairs together to form a balanced transmission line, coaxial cables, and fiber optic cables. All of these cables may be run in a network of a building (LAN's) as separate functional cables or in hybrid or combination cable design.

Furthermore, TIA/EIA has defined standards that are published and recognized as well as industry drafts of soon-to-be published standards for commercial building telecommunication networks. Table 1, which follows, provides those published and pending, or soon-to-be adopted and published Technical Service Bulletin "TSB" standards.

TABLE 1

| TIA/EIA Standards | | |
|---|---|---|
| Category 5e ISO Class D | Frequency Bandwidth 1 to 100 mhz | ANSI/TIA/EIA-568-A Commercial Building Telecommunications Standard Part 2: Balanced Twisted Pair Cabling Component; 2001 |
| Category 6 ISO Class E | Frequency Bandwidth 1 to 250 mhz | ANSI/TIA/EIA-568-B.2-1 Commercial Building Telecommunications Standard Part 2: Addendum 1: Transmission Specification for 4 pair 100 ohm Category 6 Cabling; 2002 |
| Category 6A ISO Class $E_A$ | Frequency Bandwidth 1 to 500 mhz | ANSI/TIA/EIA-568-B.2-10 Commercial Building Telecommunications Standard Part 2: Addendum 10: Transmission Specification for 4 Pair 100 ohm Augmented Category 6 Cabling; TSB pending publication |
| Category 7 ISO Class F | Frequency Bandwidth 1 to 600 mhz | TIA not actively developing standard; ISO/EIA-11801, $2^{nd}$ Ed. Information Technology - Generic Cabling for Customer Premises, 2002 |

Each of the standards of Table 1 illustrates continued widened bandwidth enabling greater data transmission. The broadening of communication cable bandwidth enhances the electrical characteristics or data bit rate based on the evolving needs of software, hardware and video transmission. The terminology within the standards for testing can be defined as electrical performance within the cable as measured by impedance, near end and far end crosstalk (NEXT & FEXT), attenuation to crosstalk ratio (ACR), ELFEXT, ELNEXT, Power Sum, etc., and the electrical performance that may be transferred to the adjacent cable a.k.a. (alien cross talk) which are measured within similar performance parameters while incorporating a power sum alien cross talk requirement.

Electromagnetic noise that can occur in a cable that runs alongside one or more cables carrying data signals can create alien crosstalk. The term "alien" arises from the fact that this form of G crosstalk occurs between different cables in a group or bundle, rather than between individual wires or circuits within a single cable. Alien Crosstalk can be particularly troublesome because of its effect on adjacent 4 pair cables which degrades the performance of a communications system by reducing the signal-to-noise ratio. Traditionally, alien crosstalk has been minimized or eliminated by aluminum Mylar® shields and/or braid in shielded cable designs i.e. (Category 7 or ISO Class F shielded designs) to prevent electromagnetic fields from ingress or egress from the cable or cables. The use of foamed or blown constructions for symmetrical and asymmetrical airspace designs further improve electrical performance characteristics in that the overall modulus and elasticity of the resulting foamed compounds are reduced leading to final conformations that more closely approach optimal geometries. Specifically, the ability to form inner structures of cables such that these inner structures have little or no plastic memory once the cabling process is completed, ensures that the nested pairs remain in the desired geometric configuration and that the use of foamed fillers, insulations and jackets using air as an insulator act to mitigate alien crosstalk in Unshielded Twisted Pair (UTP) designs i.e. (Category 6 or ISO Class E and Category 6 Augmented or ISO Class $E_A$).

These Electrical Performance Standards especially for UTP cables (Category 5e, 6, 6A and 7) necessitate improved insulative performance wherein foamed fluoropolymers optimize their inherently excellent insulative values i.e. (dielectric constant and dissipation factor.) Foamed fluoropolymers (such as perfluoropolymers) offer lower cost and lower material content while improving fire retardancy performance by lowering the amount of combustible material in a cable and the overall fire load of Local Area Network cables within a building.

A brief review of the Fire Performance Requirements both in North America and Globally follows:

In 1975, the National Fire Protection Agency (NFPA) recognized the potential flame and smoke hazards created by burning cables in plenum areas, and adopted within the United States, the National Electric Code (NEC), and a standard for flame retardant and smoke suppressant cables. This standard, commonly referred to as "the Plenum Cable Standard", was later adopted for North America Communications Cabling by Canada and Mexico. The standard permits the use of power-limited type cables that includes communication cables without conduit, so long as the cable exhibits low smoke and flame retardant characteristics. The test method for measuring these characteristics is commonly referred to as the Steiner Tunnel Test. The Steiner Tunnel Test has been adapted for the burning of cables according to the following test protocols: NFPA 262, Underwriters Laboratories (U.L.) 910, or Canadian Standards Association (CSA) FT-6. The test conditions for each of the U.L. 910 Steiner Tunnel Test, CSA FT-6, and NFPA 262 are as follows: a 300,000 BTU/hour flame is applied for 20 minutes to a calculated number of cable lengths based on their diameter that fills a horizontal tray approximately 25 feet long with an enclosed tunnel. This test simulates the horizontal areas (ceilings) in buildings wherein these cables are run.

The criteria for passing the Steiner Tunnel Test UL 910/NFPA 262 are as follows:

A. Flame spread—a maximum flame spread of less that 5.0 feet.

B. Smoke generation:
1. A maximum optical density of smoke less than 0.5.
2. An average optical density of smoke less than 0.15.

The premise of the standard is based on the concerns that flame and smoke could travel along the extent of a building plenum area if the electrical conductors and cable were involved and were not flame and smoke resistant. The National Fire Protection Association ("NFPA") developed the standard to reduce the amount of flammable material incorporated into insulated electrical conductors and jacketed cables. Reducing the amount of flammable material would, according to the NFPA, diminish the potential of the insulating and jacket materials from spreading flames and evolving smoke to adjacent plenum areas and potentially to more distant and widespread areas within a building. The cellular foamable fluoropolymer products of this disclosure can typically reduce the quantity of combustible materials by 30 to 60 percent based on the extent of the foaming process within insulations, fillers and jacket materials.

The products of the present disclosure have also been developed to support the possible adoption of a new NFPA standard referenced as NFPA 255 entitled "Limited Combustible Cables" with less than 50 as a maximum smoke index and NFPA 259 entitled "Heat of Combustion" which includes the use of an oxygen bomb calorimeter that allows for materials with less than 3500 BTU/lb. for incorporation into cabling systems and buildings wherein survivability of the communication network from fires is required i.e. (military installation such as the Pentagon in Washington D.C.).

For these applications requiring survivability from flame spread and smoke generation, the cellular products of the present disclosure will be an effective method for reducing material content and the fuel load of cables in such critical environments.

Table 2 provides a hierarchy of fire performance standards for North America and Europe.

TABLE 2

Flammability Test Methods and Level of Severity for Wire and Cable

| Cable Type | Test Method | Ignition Source Output | Duration |
|---|---|---|---|
| Limited Combustible | UL2424/NFPA 259/255/UL723 | 8,141 KJ/kg (3,500 BTU/lb.) | 10 min. |
| CMP | Steiner Tunnel UL 910/NFPA 262 | 88 kW (300 k BTU/hr.) | 20 min. |
| CMR | RISER UL 1666/UL2424/NFPA 259 | 154 kW (527 k BTU/hr.) | 30 min. |
| CPD Class D | Single Burning Item | 30 kW (102 k BTU/hr.) | 30 min. (20 min burner) |
| CPD Class D | Modified IEC 60332-3 | 30 kW (102 k BTU/hr.) (Backboard behind ladder (heat impact)) | 20 min. |

TABLE 2-continued

Flammability Test Methods and Level of Severity for Wire and Cable

| CM | IEC 60332-3 | 20.5 kW (70 k BTU/hr.) | 20 min. |
| CMX | Vertical Tray | 20.5 kW (70 k BTU/hr.) | 20 min. |
| CMUC | IEC 60332-1/ULVW-1 | Bunsen Burner | 1 min. (15 sec. Flame) |

| Cable Fire Performance (Levels of Severity) | |
| --- | --- |
| NFPA 255 & NFPA 259/LC/CPD Class B1+/UL 2424 | (most stringent) |
| NFPA 262/EN 50289/FT-6/CPD Class B1/UL 910 | |
| UL 1666 Riser/FT-4/CPD Class C & B2 | |
| UL 1581 Tray/IEC 60332-3/FT-2/CPD Class D | |
| VW 1/IEC 60332-1/FT-1/CPD Class E | (least stringent) |

SUMMARY OF THE INVENTION

In the present disclosure the term blowing agent(s), foaming agent(s), are synonymous and may be used interchangeably and are associated with chemical reactions. The term nucleating agent(s) are used in materials that provide sites for the formation of cells resulting from the chemical reaction of the blowing agents or the use of gas injection.

The present disclosure provides for the use of talc or talc derivatives which are natural or synthetic hydrated magnesium silicate compound. Talc (derived from the Persian talc via Arabic talq) is a mineral composed of hydrated magnesium silicate with the chemical formula $$H_2Mg_3(SiO_3)_4 \text{ or } Mg_3Si_4O_{10}(OH)_2$$

The present disclosure refers to talc as natural or synthetic hydrated magnesium silicate. It has been discovered that talc acts independently as a chemical blowing agent in combination with the fluoropolymers (such as perfluoropolymers) of the present invention without the need for additional blowing agents, foaming agents or the need for any other nucleating agent. In certain cases, the talc is compounded into solid fluoropolymer pellets or fluorinated polymeric foamable pellets (in the form of one or more pellets) from which foamed products may be obtained by extrusion or injection molding, wherein the pellets containing talc act as a chemical blowing agent and in some cases as a nucleating agent when the pellets are heated and extruded.

The embodiments within this disclosure reference talc as a chemical blowing agent as well as a nucleating agent except where otherwise noted. The use of talc in combination with the use of a chemical blowing agent or gas injection is also included in the scope the present disclosure.

This disclosure provides a composition, method and system for compounding foamable pellets from fluorinated polymers (either fluoropolymers (such as perfluoropolymers) and furthermore these foamable pellets may be extruded to create a lower cost communications cable, conductor separator, conductor/cable support-separator, jacketing, tape, tube, crossweb, wrap, wire insulation and as well as a conduit tube for individual components or any communications cables, conductor separators, cable support-separators, wire insulation and several combined configurations that exhibit improved electrical, flammability and optical properties.

The foamable fluoropolymers (such as perfluoropolymers) disclosed yield the inherent benefits of reducing the amount of combustible materials within a cable as well as enhancing electrical properties while reducing costs. The blown, foamed or cellular fluoropolymers (such as perfluoropolymers) insulation, jacket, or filler material using a nucleating/foaming agent of talc the chemical composition of which includes $MgSiOH$; $H_2Mg_3(SiO_3)_4$; $Mg_3Si_4O_{10}(OH)_2$; $3MgO+4SiO_2+H_2O$; $MgOH+H_2O+SiOH$; or any derivatives thereof, that synergistically reacts with the fluoropolymers (such as perfluoropolymers) at their elevated or higher extrusion operating temperatures with or without a chemical blowing agent such as magnesium carbonate, calcium carbonate, and a mixture of both magnesium carbonate and calcium carbonate. The nucleating/foaming agent capabilities of talc creates a foam ideally suited for the requirement of Category 6 and 6A UTP insulation, jacket, or and tapes and is highly cost effective at approximately $1.00 per lb. as a replacement for the traditionally used Boron Nitride (nucleating agent) that costs approximately $60.00 per lb. The talc (a chemical blowing agent and it may also act as a nucleating agent), cost significantly less than $1.00 per lb when purchased in larger quantities.

The cost reduction in cost from changing Boron Nitride to talc is one of many benefits. Another benefit of using talc is that insulation, jacketing and filler extrusion may be performed by a relatively simplistic and robust chemical reaction that uses varying extrusion temperatures to foam at various rates or percentages which are desired based on varying talc loadings. Noteworthy, under specific extrusion conditions that are described in further detail, talc itself "foams". Traditional foaming of fluoropolymers (such as perfluoropolymers) has been via a gas injection extrusion process and the use of nucleated fluoropolymers (such as perfluoropolymers) with Boron Nitride. The cost benefits of chemical foaming vis-à-vis gas foaming of fluoropolymers (such as perfluoropolymers) enable standard high temperature extruders to run foam fluoropolymers (such as perfluoropolymers) without the need to port the barrel with a highly sophisticated gas valve, as well as the design and use of a specialized compression screw. The use of talc as a nucleating agent also works effectively or as a partial or complete replacement for Boron Nitride.

An added benefit of using talc which is either alkali or base is that it neutralizes the acidity of hydrogen fluoride (HF) which may evolve during extrusion. HF is highly acidic and causes corrosion in extrusion barrels, screws and extrusion head, tools and dies. Traditional metals or non-Hasteloy or Inconel surfaces cannot be used to extrude fluoropolymers (such as perfluoropolymers) under normal process conditions and the use of talc significantly reduces the acidity of the HF, thus mitigating corrosive wear on standard extrusion equipment.

The introduction of talc has the benefit of being an acid (HF) scavenger when compounded into pellets prior to extrusion and acts as both a nucleating as well as a foaming agent. Furthermore, when enhanced with the addition of a pelletized fluoropolymers (such as perfluoropolymers) with $MgCO_3$ and $CaCO_3$ and AClyn® wax (a registered trademarked wax provided by Honeywell) fluoropolymers (such as perfluoropolymers) foaming levels are further enhanced. This foaming agent of magnesium carbonate and calcium carbonate may be added as a separate pellet in a tumble blended mix or compounded together in a single homogenous pellet of talc (MgSiOH) and $MgCO_3/CaCO_3/AClyn$ wax. The single homogenous pellet can then be extruded for communication cables, conductor separators, cable support-separators, wire insulation, jacketing, wraps, tapes, conduit tubes or any combination of said communications cables, conductor separators, cable support-separators, wire insulation, or fillers in a very simplistic chemically foamed extrusion process for fluoropolymers (such as perfluoropolymers). The foaming rate from 15 percent to 50 percent can be raised or lowered based on the percentage of each constituent used as well as by adjustments in extrusion temperatures, and screw design.

The present disclosure provides for the use of fluoropolymers and/or perfluoropolymers in any amount and in any combination. The family of fluoropolymers (such as perfluoropolymers) wherein these compounded nucleating and foaming agents may be used is at least the following:

The fluoropolymers that are characterized here are the melt processable materials for which this disclosure is focused:
 1. MFA (Polytetrafluoroethylene-Perfluoromethylvinylether)
 2. FEP (Fluorinated Ethylene Propylene)
 3. PFA (Perfluoroalkoxy)
 4. PTFE (Polytetrafluoroethylene)
 5. ETFE (Ethylene tetrafluoroethylene or (poly(ethylene-co-tetrafluoroethylene))
 6. ECTFE (Ethylene chlorotrifluoroethlyene)
 7. PVDF (Polyvinylidene Fluoride)

The perfluoropolymers that are characterized here are the melt processable materials for which this disclosure is focused:
 1. FEP (Fluorinated Ethylene Propylene)
 2. PFA (Perfluoroalkoxy)
 3. MFA (Polytetrafluoroethylene-Perfluoromethylvinylether)
 4. PTFE (Polytetrafluoroethylene)

It should be emphasized that the use of talc may be independent of the use of $MgCO_3/CaCO_3/AClyn$ wax or talc may be used in any combination with $MgCO_3/CaCO_3/AClyn$ wax to produce the desired foamed compositions.

The perfluoropolymers described are fluoropolymer resins that can be used and include copolymers of TFE with one or more copolymerizable monomers chosen from perfluorooleﬁns having 3-8 carbon atoms and perfluoro (alkyl vinyl ethers) (PAVE) in which the linear or branched alkyl group contains 1-5 carbon atoms. Preferred perfluoropolymers include copolymers of TFE with at least one hexafluoropropylene (HFP) unit and one PAVE (unit). Preferred comonomers include PAVE in which the alkyl group contains 1-3 carbon atoms, especially 2-3 carbon atoms, i.e. perfluoro (ethyl vinyl ether) (PEVE) and perfluoro (propyl vinyl ether) (PPVE). Additional fluoropolymers that can be used include copolymers of ethylene with TFE, optionally including minor amounts of one or more modifying comonomer such as perfluorobutyl ethylene. Representative fluoropolymers are described, for example, in ASTM Standard Specifications D-2116, D-3159, and D-3307. Such fluoropolymers are non-functional fluoropolymers if they have essentially no functional groups, but are functionalized fluoropolymers if functional groups are added, e.g., by grafting. Alternatively or additionally, preferred fluoropolymers are non-elastomeric, as opposed to elastomeric.

Functionalized fluoropolymers include fluoropolymers such as those described in the foregoing paragraph and additionally containing copolymerized units derived from functional monomers. If the concentration of functional monomer is high enough in a TFE copolymer, however, no other comonomer may be needed. Usually, but not necessarily, the functional groups introduced by such monomers are at the ends of pendant side groups. Functional monomers that introduce pendant side groups having such functionality can have the general formula CYZ wherein Y is H or F and Z contains a functional group. Preferably, each Y is F and —Z is —Rf —X, wherein Rf is a fluorinated diradical and X is a functional group that may contain CH2 groups. Preferably, Rf is a linear or branched perfluoroalkoxy having 2-20 carbon atoms, so that the functional comonomer is a fluorinated vinyl ether. Examples of such fluorovinylethers include $CF_2$ $CF[OCF_2\ CF(CF_3)]m$ —O—$(CF_2)n\ CH_2$ OH as disclosed in U.S. Pat. No. 4,982,009 and the alcoholic ester $CF_2$—CF $[OCF_2\ CF(CF_3)]m$ —O—$(CF_2)n$ —$(CH_2)p$ —O—COR as disclosed in U.S. Pat. No. 5,310,838. Additional fluorovinylethers include $CF_2CF[OCF_2\ CF(CF_3)]m\ O(CF_2)n$ COOH and its carboxylic ester $CF_2CF[OCF_2\ CF(CF_3)]m\ O(CF_2)n$ COOR disclosed in U.S. Pat. No. 4,138,426. In these formulae, m=0-3, n=1-4, p=1-2 and R is methyl or ethyl. Preferred fluorovinylethers include $CF_2CF$—O—$CF_2\ CF_2$ —$SO_2$ F; $CF_2\ CF[OCF_2\ CF(CF_3)]O(CF_2)_2$—Y wherein —Y is —$SO_2F$, —CN, or —COOH; and $CF_2.CF[OCF_2CF(CF_3)]O$ $(CF_2)_2$ —$CH_2$—Z wherein —Z is —OH, —OCN, —O— (CO)—$NH_2$, or —OP(O)(OH)$_2$. These fluorovinylethers are preferred because of their ability to incorporate into the polymer backbone and their ability to incorporate functionality into the resultant copolymer.

In one embodiment, a foamable composition can include at least one fluoropolymer and a chemical agent capable of functioning as both a nucleating agent and a foaming agent. In this embodiment, the chemical agent constitutes the only foaming agent present in the foamable composition. For example, the chemical agent can include talc or any talc derivative. In another example, the chemical agent can consist essentially of talc or any talc derivative.

In some embodiments, the chemical agent can be present in a concentration range of up to about 50 percent by weight of said foamable composition. In other embodiments, the chemical agent can comprise about 7.5 percent by weight of said foamable composition.

The chemical agent, such as talc or any talc derivative, can be capable of functioning as both a nucleating agent and a foaming agent upon extrusion of said foamable composition at a temperature greater than about 525 degrees F. In some embodiments, the chemical agent can be capable of functioning as both a nucleating agent and a foaming agent of the foamable composition. The chemical agent can also allow for processing of the foamable composition at a temperature of up to about 30 degrees F. below conventional temperatures normally required during extrusion of conventional foamable compositions having the at least one fluoropolymer. For example, the chemical agent can act as a processing aid to reduce or eliminate melt fracture during processing of said foamable composition.

In another embodiment, a foaming composition can include at least one fluoropolymer in a molten state at an elevated temperature and a chemical agent dispersed in the molten fluoropolymer. The chemical agent can be capable of functioning as both a nucleating agent and a foaming agent and can constitute the only foaming agent present in the foaming composition. For example, the elevated temperature of the molten state of the fluoropolymer can be sufficient to cause the at least one chemical agent to foam. In other embodiments, the elevated temperature can be, for example, any temperature in which the fluoropolymer is in a molten state, for example, the elevated temperature can be greater than 340 degrees F., such as about 570 degrees F. to about 600 degrees F. In some embodiments, e.g., for lower melting fluoropolymers, the elevated temperature can be in the range of about 430 degrees F. to about 530 degrees F. In other embodiments, the elevated temperature can be in a range of about 490 degrees F. to about 530 degrees F.

Methods of manufacturing a foamable composition are also provided. In one embodiment a method includes forming a mixture comprising a blend of a chemical agent capable of functioning as both a nucleating agent and a foaming agent and at least one base fluoropolymer using thermal and mechanical energy at a processing temperature below a temperature at which foaming of the mixture occurs, and processing the mixture to form a foamable composition. In some embodiments, the chemical agent can constitute the only foaming agent present in the mixture. In some embodiments, the foamable composition can be further processed to form a foamed article.

In one embodiment, the foamable composition comprises at least one fluoropolymer, at least one magnesium silicate compound, and a foaming agent; where the foaming agent is present in a concentration range of about 0.1 percent to about 10 percent by weight of the foamable composition.

One embodiment is the use of talc at 7 percent by weight combined with 93 percent neat resin (fluoropolymer or perfluoropolymer). In the present application talc is referred to as both a chemical agent and a foaming agent and the terms have been used interchangeably.

One embodiment is that foaming in a composition will occur with the use of talc at 10 percent by weight with 90 percent by weight of the neat resin.

In a particular embodiment, at least one magnesium silicate compound includes talc or any talc derivative.

In a particular embodiment, at least one magnesium silicate compound comprises at least one hydrated magnesium silicate compound.

In one embodiment, at least one magnesium silicate compound is present in a concentration range of up to about 50 percent by weight of the foamable composition.

In a particular embodiment, at least one magnesium silicate compound comprises about 7.5 percent by weight the foamable compound.

In a particular embodiment, at least one magnesium silicate compound comprises about 6 percent by weight of the foamable composition and the foaming agent comprising of magnesium carbonate and calcium carbonate combined comprises about 0.4 percent by weight the foamable composition.

In a particular embodiment, magnesium carbonate comprises about 0.3 percent to about 3 percent by weight the foamable composition and the calcium carbonate comprises about 0.1 to about 1 percent by weight of the foamable composition.

In a particular embodiment, at least one magnesium silicate compound comprises about 6 percent by weight the foamable composition and the magnesium carbonate comprises about 1 percent by weight of the foamable composition.

In a particular embodiment, at least one magnesium silicate compound comprises a sufficient weight percentage of the magnesium silicate compound that together with a sufficient weight percentage of only calcium carbonate forms the foamable composition.

In one embodiment the foamable composition is in the form of one or more pellets and the pellets are capable of being processed to form a foamed article.

In one embodiment the foamable composition is capable of being combined with an additional of at least one fluoropolymer and the combination is capable of being processed to form a foamed article.

In a preferred embodiment the foamable composition comprises at least one fluoropolymer, talc and any talc derivative, and an additional foaming agent where the foaming agent is present in a concentration range of about 0.1 percent to about 10 percent by weight of the foamable composition.

In a preferred embodiment the foaming composition comprises at least one fluoropolymer in a molten state at an elevated temperature, at least one magnesium silicate compound dispersed in the molten fluoropolymer, and a foaming agent dispersed in the molten fluoropolymer; where the elevated temperature is sufficient to activate the foaming agent and where the foaming agent is present in a concentration range of about 0.1 percent to about 10 percent by weight of the foaming composition.

In a particular embodiment, the elevated temperature to activate the foaming agent is greater than 525 degrees F.

In one embodiment the chemical agent is capable of functioning as both a nucleating agent and a foaming agent of the foaming composition and where the chemical agent allows for processing at a temperature of up to 30 degrees F. below the conventional temperatures normally required during extrusion of the foaming composition.

Another added benefit of using talc is that it neutralizes the acidity of hydrogen fluoride (HF) which may evolve during extrusion. HF is highly acidic and causes corrosion in extrusion barrels, screws and extrusion head, tools and dies. Traditional metals or non-Hasteloy or Inconel surfaces cannot be used to extrude perfluoropolymers under normal process conditions and the use of talc significantly reduces the acidity of the HF, thus mitigating corrosive wear on standard extrusion equipment.

In one embodiment the conventional temperatures are near or above the melting point of at least one fluoropolymer and where the chemical agent acts as a processing aid to reduce or eliminate melt fracture during processing of at least one fluoropolymer.

Pellets of the compounds described above can be created at 430-660 degrees F. and under certain conditions as low as 340 degrees F. within the extruder barrel.

One embodiment of the present application includes a first composition comprising a foaming agent comprising fluoropolymers (such as perfluoropolymers), plus talc or other talc derivative (which may include $H_2Mg_3(SiO_3)_4$; $Mg_3S_4O_{10}(OH)_2$; $3MgO+4SiO_2+H_2O$; $MgOH+H_2O+SiOH$) which is blended, melted and extruded into a solid pelletized form for extrusion that allows for blowing or foaming with or without gas injection and with or without another chemical foaming agent.

A specific embodiment includes mixtures of a foaming agent comprising perfluoropolymer pellets (85 percent) and talc (15 percent) which is compounded together via heating to a selected melting point and extruded into a pelletized form, tumble blended in pelletized form for subsequent extrusion such that the pellets are placed in an extruder, heated to a selected melting point allowing for manufacture of blown or foamed insulative components.

An additional composition may be used exclusively as a foaming agent with nucleating capabilities in a tumbled blend of 30 percent foaming agent and 70 percent perfluoropolymer pellets.

An additional embodiment includes the composition comprising a singular perfluoropolymer or a mixture of different perfluoropolymers or recycled perfluoropolymers wherein the recycled perfluoropolymers comprise from 1-100 percent of the perfluoropolymers.

In another embodiment of the composition, additional nucleating agent may be used in combination with the talc in an amount from 1 percent to 10 percent by weight.

In another embodiment the composition comprises talc in an amount from 2 percent-20 percent by weight.

Another embodiment includes the talc of the composition, during blowing or foaming, reacting synergistically with another composition to form smaller, more uniform cell structures in the foamed or blown other composition.

Additionally an embodiment is where the composition comprises 100 percent non-recycled talc powder combined with 100 percent non-recycled perfluoropolymer wherein the ratio of talc to perfluoropolymer is 0.5 percent-20 percent by weight.

In another embodiment the talc and/or the fluoropolymers (such as perfluoropolymers) may be recycled or virgin.

Another embodiment includes the extruded fourth composition comprising a foamed or blown cell structure wherein the cell structures are consistent and as small as 0.0005 inches to 0.003 inches with an average size of 0.0008 inches.

In another embodiment the foamed cells have a open and closed cell structure.

In another embodiment the composition comprises talc in an amount from 0.5 percent-20 percent by weight wherein the talc and/or fluoropolymers (such as perfluoropolymers) may be recycled materials.

Another added benefit of using talc is that it neutralizes the acidity of hydrogen fluoride (HF) which may evolve during extrusion. HF is highly acidic and causes corrosion in extrusion barrels, screws and extrusion head, tools and dies. Traditional metals or non-Hasteloy or Inconel surfaces cannot be used to extrude perfluoropolymers under normal process conditions and the use of talc significantly reduces the acidity of the HF, thus mitigating corrosive wear on standard extrusion equipment.

In another embodiment the composition comprises inorganic or organic salt(s) and fluoropolymers (such as perfluoropolymers).

In another embodiment the cellular insulation is 100 percent recyclable.

Another embodiment is that the composition may comprise either inorganic or organic additives or both that includes inorganic salts, metallic oxides, silica and silicon oxides as well as substituted and unsubstituted fullerenes.

Also in an embodiment the composition is capable of meeting specific flammability and smoke generation requirements as defined by UL 910, UL 2424, NFPA 262, 259, 255, and EN 50266-2-x, class B test specifications.

Another embodiment includes the use of a twin-screw extruder for melting, blending and pelletizing the composition. In more detail, the compounding process utilizes a two-step system to insure the foaming components are thoroughly distributed and dispersed in the base polymer of the final compound. The first step requires a masterbatch blend be made of the foaming agents. The foaming agents are in a fine powder form and a high intensity blender, (i.e. Henschel type) is used to prepare the powder blend according to the specified formulation. A certain amount of resin, also in powder form, can be used in the first blending step as a mechanism to predisperse the foaming agents and aid in the second extrusion compounding step. The second stage of the compound preparation process utilizes a twin screw extrusion compounding system to incorporate the foaming agent masterbatch blend with the base resin. The design of the compounding screw is such that there is sufficient heat and mechanical energy to fully thermally melt the base polymer and incorporate the masterbatch blend with proper distribution and dispersion during mixing for homogeneity, but yet mild enough to keep the processing temperature of the compound below that in which foaming may be prematurely initiated. The final compound can be strand extruded and pelletized or alternatively an underwater pelletizing technique may be used (in other words air or water cooling is acceptable).

In one embodiment the method of manufacturing a foamable composition comprises forming a mixture comprising of a blend of a magnesium silicate compound, a foaming agent and, at least one base fluoropolymer using thermal and mechanical energy at a processing temperature below a temperature at which foaming of the mixture occurs; where the foaming agent is present in a concentration range of about 0.1 percent to about 10 percent by weight of the mixture and; then processing the mixture to form a foamable composition.

In a particular embodiment, the method of further comprising pelletizing the extrudate to form a plurality of foamable pellets.

In a particular embodiment, the method where the processing of the mixture results in one or more foamable pellets having a solid phase such that the foamable pellets are capable of being processed to form a foamed article.

In a particular embodiment, the method where the foamable composition is produced at a temperature low enough to prevent the foamable composition from foaming.

In a particular embodiment, the method where the temperature is sufficiently low so as to thermally constrain the foamable composition from foaming.

In a particular embodiment, the method where processing the foamable composition comprises applying energy to the foamable composition.

In a particular embodiment, the method where applying the energy can be any of heat, pressure, or a combination of heat and pressure.

In a particular embodiment, the method where processing the foamable composition comprises melt processing.

In a particular embodiment, the method where foamable compositions is in a solid state or a molten state.

In one embodiment, a method for manufacturing a foamed article comprises providing a foamable composition including at least one fluoropolymer, at least one magnesium silicate compound and, a foaming agent, where the foaming agent is present in a concentration range of about 0.1 percent to about 10 percent by weight of the foamable composition and, extruding the foamable composition to form a foamed article.

In a particular embodiment, the method where the foamed article comprises communications cables, conductor separators, cable support-separators, wire insulation, jacketing, wraps, tapes, conduit tubes, or any combination of the communications cables, conductor separators, cable support-separators, wire insulation.

Another embodiment is a method and system for heating the talc powder and a selected pelletized fluoropolymer (such as perfluoropolymer) creating a melt blendable composition, extruding the molten composition, cooling the molten composition and forming the solid composition into a pelletized nucleating and foaming agent.

Another embodiment includes a communications cables, conductor separators, conductor/cable support-separators, jacketing, tapes, wraps, wire insulations, conduit tubes, or any combination of the communications cables, conductor separators, cable support-separators, wire insulation individually comprising the same blown or foamed composition or may utilize the composition that includes selected fluoropolymers (such as perfluoropolymers).

Another embodiment of the disclosure includes the use of a foamed core and/or the use of a hollow center of the core, which in both cases significantly reduces the material required along the length of the finished cable. The effect of foaming and/or producing a support-separator with a hollow center portion should result in improved flammability of the overall cable by reducing the amount of material available as fuel for the UL 910 test, improved electrical properties for the individual non-optical conductors, and reduction of weight of the overall cable.

A method and system wherein the blown and/or foamed perfluoropolymer composition, cable, support-separator, conduit tube, insulation, jacketing, wrapping and/or taping line speeds are at or about 75 to 1500 ft/min.

Additional benefits of the embodiments include reduction of the overall material mass required for conventional spacers, insulation and jacketing which contributes to flame and smoke reduction.

Another embodiment of the disclosure includes the using this foam process, with either chemical or gas foaming, and placing the foam skin with both being the same materials e.g. (Perfluoropolymers) in a coextrusion or a second extrusion of a thermoplastic non-fluoropolymer as a skin or encapsulated by a layer of foam or solid perfluoropolymer skin as an insulation, cable filler or jacket.

In an embodiment of the present disclosure it has been found that talc, generally known as a nucleating agent in foamed plastics, exhibits blowing agent properties without the presence of a blowing agent.

Another embodiment combines talc, as a blowing agent, with resin(s) in the absence of any additional chemical blowing agent wherein the talc comprises 2-50 percent by weight of the resin and wherein the resulting composition is extruded into an extrudate product.

In another embodiment the talc is combined with a resin as a masterbatch in a percentage of up to 15 percent talc by weight to resin and extruded as a pellet.

In another embodiment the talc is combined with a recycled resin as a masterbatch in a percentage of up to 20 percent talc by weight to recycled resin and extruded as a pellet.

In another embodiment the resin(s) may be perfluoropolymers as a subset of fluoropolymers FEP, MFA, PFA perfluoropolymers or semicrystalline fluoropolymers ECTFE, ETFE, PVDF, and PTFE, etc. as pure resin, recycled resin, as a single resin or in combination with other resins.

In yet another embodiment the extrudate is a pellet, insulation, jacketing, wire insulation.

In another embodiment the compounding pellet that is processed as an extrudate is sufficiently low temperature so that the fluoropolymer resin(s) are thermally constrained from foaming and subsequently extruded into jackets, separators, insulation, etc.

In another embodiment the pellets are extruded at a sufficiently high temperature so that the resin is receptive to the talc blowing agent wherein the product is a foamed article.

In another embodiment the pellets may optionally include a color concentrate.

Another object of the disclosure is a foamed insulation comprising said composition.

Still an object of the invention is a process for manufacturing the composition.

Still another object of the disclosure is a process for manufacturing foamed insulation from the composition.

Other objects of the disclosure include recycled or waste materials to form these compositions (pelletized or otherwise), which can be processed and tumble blended with or without virgin or bare fluoropolymers (such as perfluoropolymers) to obtain acceptable foamable compositions after heating and extrusion.

Additionally it is known that foamed or blown articles or foamed composition produced with a gas blowing agent can be used in combination with talc leading to an increase in the percentage of cellular structure within a foamed or foamable composition when the combination of talc and either a chemical or gas blowing agent is used. This works with the use of pellets that incorporate talc and where these pellets have been formed when talc and fluorinated polymers form pelletized extrudate. The pelletized extrudate (pellets) are then subsequently heated via extrusion, molding, etc. to form the foamed, blown or cellular articles of matter. These pellets are known as "foamable" pellets or foamable fluoropolymer compositions that may incorporate perfluoropolymers.

Additionally the pellets are suitable for foaming or blowing such that when the pellets are combined with additional one or more selected fluoropolymer (such as perfluoropolymers) in an amount of 7 weight percent to 70 weight percent of the pellets to form an extrudate that is a foamed cellular insulation article.

Another embodiment is a method for manufacturing foamed or blown perfluoropolymer cellular insulation compositions wherein a second composition is a blowing or foaming agent comprising 20 weight percent of the first composition and 80 weight percent of the selected one or more perfluoropolymers heated to an appropriate melting point with homogeneously blending, extruding, cooling and forming into pellets using chemical or gas injection methods.

Another embodiment is an extrusion process wherein extrusion of a composition capable of forming cellular foam is extruded in an extruder wherein the extruder is specifically designed to minimize mechanical shear and increased heating mitigating premature foaming during the process of melting, blending, extruding and pelletizing said composition as well as mitigating corrosion of the extruder barrel due to passivation of acid and acidic gases provided by the use of talc with the fluoropolymers (such as perfluoropolymers) during the extrusion process.

An additional embodiment is the perfluoropolymer compositions having been added into an extruded melt of a base perfluoropolymer resin, in sequential steps, sufficient talc to accomplish a loading of talc in a range of 0.5 to 20 percent in combination with perfluoropolymer resin forming compound pellets, wherein the compositions may be used for subsequent heat extrusion or molding processes and provide cellular or foamed or blown fluoropolymer (such as perfluoropolymer) end products.

In another embodiment the compounded pellets comprise 7.5 weight percent talc and 92.5 weight percent perfluoropolymer resin.

The perfluoropolymer compositions may be extruded or molded into desired shapes and geometries without pelletizing, wherein the talc is acting as a chemical blowing agent and may also act as a nucleating agent, a foaming agent or both during extrusion or molding.

The foamed cellular insulation article reduces the quantity of combustible materials by 30 to 60 percent based on the extent of the foaming process, wherein the foamed cellular insulation article is achieved with or without a chemical blowing agent or gas blowing agent.

Another embodiment is a method of making a communications cable having flame retardant properties comprising the steps of; mixing the pellet(s) at a temperature of at most 600 degrees F. to ensure reaching the melting point of the fluoropolymer and melt processing the cable compositions at predetermined temperatures exceeding 525 degrees F. to ensure reaching the required temperature of the blowing agent, extruding a metered amount of a melted composition around an advancing electrical conductor and allowing the composition to foam and expand to produce an insulated conductor with a chemically blown perfluoropolymer insulation.

The pellets comprise 7.5 weight percent of said talc and 92.5 weight percent of the fluoropolymer (such as perfluoropolymer).

The pellets comprise from 2 to 30 weight percent of said talc and 98 to 70 weight percent of the fluoropolymer (such as perfluoropolymer).

The talc or talc derivative is a chemical composition of a magnesium hydrosilicate represented by the formula; $3MgOSiO_2H_2O$, wherein $SiO_2$ is 63.5 percent weight, MgO is 31.90 percent weight and $H_2O$ is 4.75 percent weight and optionally includes other minerals including magnesite, chlorite, calcite, magnetite, carbonate, and dolomite.

The pellets are chemically foamed or blown via an extrusion process, a molding process or any known process requiring heat and/or pressure to achieve a commercially viable cellular product(s).

The cellular product(s) include FEP, PFA and MFA, PTFE, ETFE, ECTFE or PVDF the resulting foamed extrudate of which comply with fire and smoke and sheathing requirements for LAN which may include electrical and/or optical fiber conductors within the cable.

Included as an embodiment in the present application is a foamable composition, comprising;
at least one fluoropolymer, and;
a chemical agent capable of functioning as both a nucleating agent and a foaming agent;
wherein the chemical agent constitutes the only foaming agent present in the foamable composition.

An additional embodiment wherein the chemical agent is capable of functioning as both a nucleating agent and a foaming agent of the foamable composition and wherein the chemical agent allows for processing the foamable composition at a temperature of up to about 30 degrees F. below conventional temperatures normally required during extrusion of conventional foamable compositions having at least one fluoropolymer.

A further embodiment includes a foamable composition capable of being combined with an additional one or more fluoropolymers and the combination is capable of being processed to form a foamed article.

An additional embodiment includes a foamable composition comprising; at least one fluoropolymer, and; a foaming composition consisting essentially of one or more magnesium silicate compounds.

A further embodiment includes a foaming composition comprising: at least one fluoropolymer in a molten state at an elevated temperature, and; a chemical agent dispersed in the molten fluoropolymer, the chemical agent capable of functioning as both a nucleating agent and a foaming agent; wherein the chemical agent constitutes the only foaming agent present in the foaming composition and wherein the elevated temperature is sufficient to cause said at least one chemical agent to foam.

A further embodiment includes an additional method of manufacturing a foamable composition is included herein comprising: forming a mixture comprising a blend of a chemical agent capable of functioning as both a nucleating agent and a foaming agent, and; at least one base fluoropolymer using thermal and mechanical energy at a processing temperature below a temperature at which foaming of the mixture occurs wherein the chemical agent constitutes the only foaming agent present in the mixture, and processing the mixture to form a foamable composition.

As additional embodiment, included is the method for manufacturing foamable perfluoropolymer cellular insulation compositions, wherein one composition includes up to 20 weight percent of a blowing or foaming agent and a second composition comprises up to 80 weight percent of one or more selected perfluoropolymers heated to a melting point to assure homogeneous blending, extruding, and cooling forming pellets that together with chemical or gas injection methods provide foamed articles.

Additionally, the method for manufacturing foamable fluoropolymer compositions include using organic or inorganic salt(s) together with one or more selected perfluoropolymers.

In a further embodiment, pellets are formed such that magnesium carbonate, calcium carbonate, or both magnesium carbonate and calcium carbonate are added into forming a separate pellet in a tumble blended mix or compounded together into a single homogenous pellet of talc and a blend of magnesium carbonate, calcium carbonate and Aclyn wax.

The same pellets may also include in their composition a color concentrate.

Additionally, another embodiment the insulation can be used for metal or optical conductors including insulation forming a separator comprising; an inner core of a non-fluoropolymer or fluoropolymer and an outer layer covering the core comprising a foamed or foamed skinned perfluoropolymer wherein a cellular foaming extrusion process is performed using a single or dual head extruder and wherein the cellular foam is formed by chemical means, gas injection means or both chemical and gas injection means.

In an additional embodiment includes an extrusion process wherein extrusion of a composition capable of forming a cellular foamed article is extruded in an extruder wherein the extruder is specifically designed to minimize mechanical shear and increase heating thereby mitigating premature foaming during the process of melting, blending, extruding, and pelletizing the composition as well as mitigating corrosion of the extruder barrel due to passivation of acid and acidic gases evolving from the use of talc together with the perfluoropolymers and fluoropolymers during the extrusion process.

A further embodiment includes fluoropolymer compositions comprising; adding into an extruded melt of a base fluoropolymer resin, in sequential steps, sufficient talc to accomplish a loading of talc in a range of 0.5 to 20 percent in combination with fluoropolymer resin to form pellets wherein the pellets are used for subsequent extrusion or molding processes providing cellular, foamed, or blown fluoropolymer end products.

An additional embodiment includes compositions that are extruded or molded into desired shapes and geometries without requiring pelletizing, wherein the talc acts as a chemical blowing agent and may also act as a nucleating agent, a foaming agent, or both a nucleating and foaming agent during extrusion or molding processes.

The embodiment above wherein the talc neutralizes the acidity of hydrogen fluoride and provides for lubricating and mitigating corrosion in extrusion barrels, screws, extrusion heads, tools and dies.

A further embodiment includes the use of talc significantly reduces the acidity of hydrogen fluoride during extrusion of the perfluoropolymer compositions.

An additional embodiment includes foamed cellular insulation articles that reduce the quantity of combustible materials by 30 to 60 percent based on the extent of the foaming process and wherein cellular foamed insulation articles are achieved with or without a chemical blowing agent or gas blowing agent.

The embodiment above wherein gas blowing agents are used in combination with talc leading to an increase in the percentage of cellular structure within the cellular foamed insulation article.

Another embodiment includes a method of making a communications cable having flame retardant properties comprising the steps of;
mixing the pellet(s) of the present application (any of those described or contemplated) at a temperature of at most 600° F. to ensure reaching the melting point of the polymer and melt processing the composition at a predetermined temperature exceeding 525° F. to ensure reaching the required temperature for the blowing agent, extruding a metered amount of a melted composition around an advancing electrical conductor and allowing the composition to foam and expand to produce an insulated conductor with a chemically blown perfluoropolymer insulation.

The embodiment above includes pellets comprising perfluoropolymers or fluoropolymers and a blowing agent consisting essentially of talc or any talc derivative, wherein the talc or any talc derivative is a natural or synthetic hydrated magnesium silicate.

Further to the latest two embodiments above, the talc or any talc derivative may be a chemical composition comprising magnesium hydrosilicate represented by the formula; $3MgOSiO_2H_2O$, wherein $SiO_2$ is 63.5 weight percent MgO is 31.90 weight percent and $H_2O$ is 4.75 weight percent and can also include other minerals comprising; magnesite, chlorite, calcite, magnetite, carbonate, and dolomite.

A further embodiment includes cellular product(s) using one or more of the following; FEP, PFA MFA, PVDF, ECTFE, ETFE, and PTFE, the resulting foamed extrudate of which comply with fire and smoke and sheathing requirements for electrical or fiber optic cable.

Cellular material formed by heating pellets having a perfluoropolymer and a blowing agent consisting primarily of talc, to a temperature above the melting temperature of the perfluoropolymer, and above the required temperature of the talc.

The cellular material is formed by heating the pellets during an extrusion process.

The disclosure includes and defines a cable utilizing the compositions described above.

DETAILED DESCRIPTION OF THE INVENTION

For the purpose of the present invention, the expressions "fluoropolymer" is intended to denote any polymer comprising recurring units (R), with more than 25 weight percent of recurring units (R) being derived from at least one ethylenically unsaturated monomer comprising at least one fluorine atom (hereinafter, fluorinated monomer).

The fluoropolymer comprises preferably more than 30 weight percent more preferably more than 40 percent weight of recurring units derived from the fluorinated monomer.

The fluorinated monomer can further comprise one or more other halogen atoms (Cl, Br, I). When the fluorinated monomer is free of a hydrogen atom, it is designated as per(halo)fluoromonomer. When the fluorinated monomer comprises at least one hydrogen atom, it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the fluoropolymer may comprise recurring units derived one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

In an embodiment of the invention, the polymer is a hydrogen-containing fluoropolymer. By "hydrogen-containing fluoropolymer" it is meant a fluoropolymer as above defined comprising recurring units derived from at least one hydrogen-containing monomer. A hydrogen-containing monomer may be the same monomer as the fluorinated monomer or can be a different monomer.

Thus, this definition encompasses notably copolymers of one or more per(halo)fluoromonomers (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated comonomers. The hydrogen-containing fluoropolymer are preferably chosen among:

TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30 percent by moles, based on the total amount of TFE and/or CTFE and hydrogenated comonomer(s) (see for instance U.S. Pat. No. 3,624,250 and U.S. Pat. No. 4,513,129);

Vinylidene fluoride (VdF) polymers, optionally comprising reduced amounts, generally comprised between 0.1 and 15 percent by moles, of one or more fluorinated comonomer(s) (see for instance U.S. Pat. No. 4,524,194 and U.S. Pat. No. 4,739,024), and optionally further comprising one or more hydrogenated comonomer(s); and mixtures thereof.

As used here, a blowing agent comprising "primarily talc" achieves at least most of its blowing function from talc. In certain exemplary embodiments wherein the blowing agent comprises primarily talc, the blowing agent is at least 30 weight percent talc. That is, in such embodiments talc is at least 30 weight percent of all materials operative as a blowing agent in the composition in the intended extrusion or other forming operation. In certain exemplary embodiments the blowing agent is at least 10 weight percent talc. In certain exemplary embodiments the blowing agent is at least 20 weight percent talc. In certain exemplary embodiments the blowing agent consists essentially of talc. In certain exemplary embodiments talc is used in combination with other blowing agents, including, e.g., boron nitride and/or other known blowing agents as well as any of the derivatives of talc. Magnesium carbonate and calcium carbonate are additional chemical agents that may used in combination with talc or any of the derivatives of talc.

Working Compounding Example 1

A composition including talc (MgSiOH; 3MgO+4SiO2+H2O; MgOH+H2O+SiOH) or other talc/talc derivatives such as $Mg_3Si_4O_{10}(OH)_2$ is sequentially added into the feeder section with base perfluoropolymer resin in a ratio of 15 percent-20 percent talc and 80 percent-85 percent perfluoropolymer resin. The extrusion of the base resin perfluoropolymer is pelletized into a single pellet. The temperature profile for zones 1 through 6 would be as follows: 520, 530, 540, 560, 580 and 600 degrees Fahrenheit. The process temperatures of this single compound pellet with 7.5 percent talc and 92.5 percent perfluoropolymer resin is kept to a minimum to ensure no premature foaming occurs during pellet formation. The pellets are then extruded on a 30 to 1 ratio high temperature extruder with temperature zones of 525, 535, 550, 580, 640 and 660 degrees Fahrenheit for the subsequent extrusion into profiles, insulations and jackets.

Working Insulation Extrusion Example 2

A foamed perfluoropolymer insulation was extruded over 24 gage wire by using a cross head with a tip and die. The extruder was a high temperature 1½ inch, 30:1 ratio device. The screw design was a 4:1 high compression screw. The line speeds were in a range from 400 ft/min. to 1500 ft/min. The screw rpm were from 12 rpm to 35 rpm with pressure ranging from 1500 psi to 2000 psi. The melt temperature was 678 degrees F. The extruder was loaded with pellets containing 10 percent talc and 90 percent FEP. This resulted in an insulation extrudate that was 41 percent foamed with an average foamed cell size of 0.0007 inches.

Working Profile Extrusion Example 3

A cross web cable support-separator was manufactured with a 1½ inch high temperature extruder using the following materials and conditions;

Use of a cross web die with a high compression screw, a line speed of 148 ft./min. at a pressure of 1700 psi with a 48 RPM screw speed and a melt temperature of 649 degrees F. The extruder was loaded with a pellet master batch, the pellet comprising 15 percent talc and 85 percent FEP. The pellet master batch was blended in a 50:50 ratio with 100 percent FEP. Therefore, the final blend ratio was 50 percent master batch pellets and 50 percent FEP. This resulted in a cross web extrudate that was 40 percent foamed with an average foamed cell size of 0.0006 inches.

Working Profile Extrusion Example 4

A Double Helix cable support-separator was manufactured using a 1½ inch extruder with the following materials and conditions;

A web cable support-separator was manufactured using a profile extrusion die with a high compression screw, a line speed of 75 ft./min. at a pressure of 1850 psi with a 40 RPM screw speed and a melt temperature of 646 F. The extruder was loaded with master batch pellets containing 15 percent talc and 85 percent FEP. This master batch was blended with 100 percent FEP. The final blend ratio was 70 percent master batch pellets and 30 percent FEP. This resulted in a web extrudate that was 33 percent foamed with an average foamed cell size of 0.0007 inches.

Working Insulation Extrusion Example 5

A foamed perfluoropolymer insulation was extruded over 24 gage wire by using a cross head with a tip and die. The extruder was a high temperature 1½ inch, 30:1 ratio device. The screw design was a 4:1 high compression screw. The line speeds were in a range from 300 ft/min. to 900 ft/min. The screw rpm were from 12 rpm to 30 rpm with pressure ranging from 1500 psi to 2000 psi. The melt temperature was 680 F. The extruder was loaded with pellets containing 10 percent talc and 90 percent FEP. This resulted in an insulation extrudate that was 35 percent foamed with an average foamed cell size of 0.0007 inches.

Other desired embodiments, results, and novel features of the present invention will become more apparent from the following drawings, detailed description of the drawings, and the accompanying claims.

DETAILED DESCRIPTIONS

The following description will further help to explain the inventive features of the system, method and composition of the present disclosure.

The composition is comprised of magnesium silicate hydroxide, commonly known as talc and perfluoropolymer. The ratio of talc is at or about 15 percent with the perfluoropolymer at or about 85 percent by weight, however the talc may range in concentration from 0.2 to 20 percent and up to 50%. The perfluoropolymer component of the composition may be MFA, FEP, PFA, or ETFE, as a selected, uniform, pure fluoropolymer (such as perfluoropolymer) or as a mixture of one or more different fluoropolymers (such as perfluoropolymers) or 100 percent recycled and/or blended with non-recycled perfluoropolymers in any ratio from 1 to 99 percent. The composition is then placed in an extruder specifically designed to minimize heat transfer such that foaming or nucleation is not prematurely initiated and such that the composition may be melted, blended, extruded and pelletized. Additionally, an organic or inorganic salt may be added to the pellet composition.

The composition may also comprise inorganic and/or organic additives that include inorganic salts, metallic oxides, silica and silicon oxides as well as substituted and unsubstituted fullerenes.

The pellet composition may then be blended with virgin or recycled fluorinated polymers, fluoropolymers (such as perfluoropolymers), extruded at a temperature higher than the foaming or nucleation temperature so that foaming and nucleation occur in the fluorinated polymers.

It will, of course, be appreciated that the system, method and compositions that have been described have been given simply by the way of illustration, and the disclosure is not limited to the precise embodiments described herein; various changes and modifications may be effected by one skilled in the art without departing from the scope or spirit of the invention as defined in the inventive claims.

What is claimed is:

1. A foaming composition comprising:
   a foamable composition being melt processable at an elevated temperature of at least about 600 degrees F., said foamable composition comprising at least one fluoropolymer and talc or a talc derivative dispersed in said fluoropolymer;
wherein each fluoropolymer is thermally processable at a temperature in a range of about 678 degrees F. to about 680 degrees F.,
wherein said talc or talc derivative is present in a concentration range of about 3 percent to about 15 percent by weight of said foamable composition and constitutes the only foaming agent present in the foamable composition and wherein said elevated temperature is sufficient to melt said at least one fluoropolymer and to cause said talc or talc derivative to foam,
wherein said foaming composition is capable of being processed so as to form a foamed article comprising foamed cells having diameters in the range of about 0.0005 inches to about 0.003 inches, and
wherein said foamed cells have a closed cell structure.

2. The foaming composition of claim 1, wherein said at least one fluoropolymer comprises two or more different fluoropolymers.

3. The foaming composition of claim 1, wherein said elevated temperature is in a range of about 600 degrees F. to about 660 degrees F.

4. The foaming composition of claim 1, wherein said elevated temperature is in a range of about 630 degrees F. to about 660 degrees F.

5. The foaming composition of claim 1, wherein said elevated temperature is in a range of about 640 degrees F. to about 660 degrees F.

6. The foaming composition of claim 1, wherein said talc or talc derivative is capable of functioning as both a nucleating agent and a foaming agent of said foaming composition.

7. The foaming composition of claim 1, wherein said foamable composition consists essentially of said at least one fluoropolymer and said talc or talc derivative.

8. The foaming composition of claim 1, wherein said talc or talc derivative comprises about 7.5 percent by weight of said foamable composition.

9. The foaming composition of claim 1, wherein said talc or talc derivative comprises about 6 percent by weight of said foamable composition.

10. The foaming composition of claim 1, wherein said at least one fluoropolymer comprises a perfluoropolymer.

11. The foaming composition of claim 1, wherein said foamed article is capable of meeting specific flammability and smoke generation requirements as defined by UL 910, UL 2424, NFPA 262, 259, 255, and EN 50266-2-x, class B test specifications.

12. The foaming composition of claim 1, wherein said foamed cells have an average diameter of about 0.0008 inches.

13. The foaming composition of claim 1, wherein said foamed article is selected from the group consisting of communications cables, conductor separators, cable support-separators, wire insulation, jacketing, wraps, tapes, and conduit tubes.

14. The foaming composition of claim 1, wherein said at least one fluoropolymer is selected from the group consisting of tetrafluoroethylene/perfluoromethylvinyl ether copolymer (MFA), hexafluoropropylene/tetrafluoroethylene copolymer (FEP), and perfluoroalkoxy (PFA) and combinations of any two or more of said MFA, FEP, PFA.

15. A foamed article made by a process comprising:
heating a melt processable foamable composition to an elevated temperature of at least about 600 degrees F.,
said foamable composition comprising at least one fluoropolymer and talc or a talc derivative dispersed in said fluoropolymer,
wherein each fluoropolymer is thermally processable at a temperature in a range of about 678 degrees F. to about 680 degrees F.,
wherein said talc or talc derivative is present in a concentration range of about 3 percent to about 15 percent by weight of said foamable composition and constitutes the only foaming agent present in the foamable composition,
wherein the elevated temperature of at least about 600 degrees F. is sufficient to melt said at least one fluoropolymer and to cause said talc or talc derivative to foam,
wherein the foamed article comprises foamed cells having diameters in the range of about 0.0005 inches to about 0.003 inches, and
wherein said foamed cells have a closed cell structure.

16. The foamed article of claim 15, wherein said foamed cells have an average diameter of about 0.0008 inches.

17. A foaming composition comprising:
a foamable composition being melt processable at an elevated temperature of at least about 600 degrees F.,
said foamable composition comprising at least one perfluoropolymer and talc or a talc derivative dispersed in said perfluoropolymer;
wherein each perfluoropolymer is thermally processable at a temperature in a range of about 678 degrees F. to about 680 degrees F.,
wherein said talc or talc derivative is present in a concentration range of about 3 percent to about 15 percent by weight of said foamable composition and constitutes the only foaming agent present in the foamable composition,
wherein said elevated temperature of at least about 600 degrees F. is sufficient to melt said at least one perfluoropolymer and to cause said talc or talc derivative to foam,
wherein said foaming composition is capable of being processed so as to form a foamed article comprising foamed cells having diameters in the range of about 0.0005 inches to about 0.003 inches, and
wherein said foamed cells have a closed cell structure.

18. The foaming composition of claim 17, wherein said at least one perfluoropolymer is selected from the group consisting of tetrafluoroethylene/perfluoromethylvinyl ether copolymer (MFA), hexafluoropropylene/tetrafluoroethylene copolymer (FEP), and perfluoroalkoxy (PFA) and combinations of any two or more of said MFA, FEP, PFA.

19. A foaming composition comprising:
a foamable composition being melt processable at an elevated temperature of at least about 600 degrees F.,
said foamable composition comprising (i) at least one perfluoropolymer selected from the group consisting of tetrafluoroethylene/perfluoromethylvinyl ether copolymer (MFA), hexafluoropropylene/tetrafluoroethylene copolymer (FEP), and perfluoroalkoxy (PFA) and combinations of any two or more of said MFA, FEP, PFA and (ii) talc or a talc derivative dispersed in said perfluoropolymer;
wherein each perfluoropolymer is thermally processable at a temperature in a range of about 678 degrees F. to about 680 degrees F.,
wherein said talc or talc derivative is present in a concentration range of about 3 percent to about 15 percent by weight of said foamable composition and constitutes the only foaming agent present in the foamable composition and wherein said elevated temperature of at least about 600 degrees F. is sufficient to melt said at least one perfluoropolymer and to cause said talc or talc derivative to foam, wherein said foaming composition is capable of being processed so as to form a foamed article comprising foamed cells having diameters in the range of about 0.0005 inches to about 0.003 inches, and wherein said foamed cells have a closed cell structure.

20. A foaming composition comprising:

a foamable composition being melt processable at an elevated temperature of at least about 600 degrees F., said foamable composition comprising (i) at least one perfluoropolymer selected from the group consisting of tetrafluoroethylene/perfluoromethylvinyl ether copolymer (MFA), hexafluoropropylene/tetrafluoroethylene copolymer (FEP), and perfluoroalkoxy (PFA) and combinations of any two or more of said MFA, FEP, PFA and (ii) talc or a talc derivative dispersed in said perfluoropolymer in a concentration range of about 3 percent to about 15 percent by weight of said foamable composition, said talc or talc derivative capable of functioning as both a nucleating agent and a foaming agent;

wherein each perfluoropolymer is thermally processable at a temperature in a range of about 678 degrees F. to about 680 degrees F., wherein said talc or talc derivative is the only foaming agent present in the foamable composition and wherein said elevated temperature of at least about 600 degrees F. is sufficient to melt said at least one perfluoropolymer and to cause said talc or talc derivative to foam, wherein said foaming composition is capable of being processed so as to form a foamed article comprising foamed cells having diameters in the range of about 0.0005 inches to about 0.003 inches, and wherein said foamed cells have a closed cell structure.

* * * * *